United States Patent [19]
Kahl et al.

[11] Patent Number: 5,428,735
[45] Date of Patent: Jun. 27, 1995

[54] METHOD AND APPARATUS FOR MAINTAINING A RECORD OF SET-CREATING DATA PROCESSING ACTIVITIES AND ASSOCIATED DATA SETS

[75] Inventors: Daryl J. Kahl, Flower Mound; Chen D. King, Colleyville; Raymond E. Lee, Irving, all of Tex.; Sharon Stanners, Boca Raton, Fla.; Robert J. Torres, Colleyville, Tex.

[73] Assignee: International Business Machines Corporation, Armonk, N.Y.

[21] Appl. No.: 997,397

[22] Filed: Dec. 28, 1992

[51] Int. Cl.⁶ .............................................. G06F 17/30
[52] U.S. Cl. ..................... 395/159; 395/160; 395/600
[58] Field of Search ............. 345/115; 364/419.13, 364/419.19, 419.07, 419.08; 395/153, 160, 161, 600, 159

[56] References Cited

U.S. PATENT DOCUMENTS

| | | | |
|---|---|---|---|
| 5,157,783 | 10/1992 | Anderson et al. | 395/600 |
| 5,175,814 | 12/1992 | Anick et al. | 395/161 |
| 5,263,167 | 11/1993 | Conner, Jr. et al. | 395/700 |
| 5,265,014 | 11/1993 | Haddock et al. | 364/419.08 |
| 5,265,246 | 11/1993 | Li et al. | 395/600 |
| 5,312,478 | 5/1994 | Reed et al. | 395/148 |

FOREIGN PATENT DOCUMENTS 0477152 3/1992 European Pat. Off. .
0491517 6/1992 European Pat. Off. .
9112582 8/1991 WIPO .

OTHER PUBLICATIONS

"Text Search and Retrieval Reference Manual for the Automated Patent System", U.S. Department of Commerce (Dec. 3, 1991), pp. 1–42.
"Microsoft Excel User's Guide", Microsoft, Corp. (1990), pp. 4–5, 67–100, 147, and 183.
"Microsoft Windows Users Guide", Microsoft, Corp. (1990), pp. 103–137.

Primary Examiner—Mark K. Zimmerman
Assistant Examiner—N. Kenneth Burraston
Attorney, Agent, or Firm—Jonathan E. Jobe; Melvin A. Hunn; Andrew J. Dillon

[57] ABSTRACT

A method for maintaining a record of set-creating data processing activities and associated data sets. The method includes the steps of creating and displaying a plurality of visual representations, one for each of the set-creating activities, and arranging the visual representations to indicate a hierarchical relationship within the set-creating activities. The visual representations may be used to select for viewing a particular one of either the set-creating activities or the associated data sets, and displaying them on the data processing system. The display may correspond to a duration of an operator input activity, or to a time interval defined by an initiating operator input at a terminating operator input. In its simplest form, the method requires the arrangement of the visual representations in a hierarchy which corresponds to set-creation chronology.

26 Claims, 9 Drawing Sheets

METHOD AND APPARATUS FOR MAINTAINING A RECORD OF SET-CREATING DATA PROCESSING ACTIVITIES AND ASSOCIATED DATA SETS

BACKGROUND OF THE INVENTION

1. Technical Field

The present invention relates in general to set-creating data processing operations, and in particular to searching operations which are performed in a data processing environment.

2. Description of the Related Art

Modern data processing systems allow operators to manipulate data at astounding rates; processing speeds of microprocessors in data processing systems have long ago ceased to be a major impediment to the speed and efficiency of most operator activities. Instead cumbersome user interfaces have developed into a potentially serious impediment to efficient operator interaction with the data processing system. The operations of opening, positioning, sizing and closing windows can place considerable strain on a user, particularly when complicated tasks are being performed or when the computer display screen is crowded with overlapping windows. This is especially true when an operator uses a data processing system to create and manipulate sets of data. One particularly useful set-creating activity is the use of set operations to search databases or software objects. Such operations are quite common, and include full-text key word searching, full-text character string searching, and descriptor field searching.

For example, key word or character string search operations may be used to search commercial databases containing and identifying books in print or periodicals, to identify the pertinent literature relating to a particular topic. Key word or character string search operations may be used to research products or companies in several commercially-available electronic databases. Alternatively, descriptor field searching operations may be performed to search selected data fields only; for example, such operations may be used to locate companies or products by conventional standard industrial codes; to identify publicly-traded companies by stock exchange identifiers; or to identify books by international standard book numbers. Descriptor field searching is usually more efficient, since the full text of the database need not be searched.

The principal difficulty for the operator in performing a plurality of set-creating operations is the coordination and implementation of a search strategy in a user interface that requires frequent user input and manipulation. For example, user interfaces that require the continuous opening and closing of windows or the sorting and storing of data sets introduce significant distraction, which can result in search strategy errors, the loss of data sets, or the performance of incomplete or inconclusive searches. One additional difficulty encountered in set-creating activities is that search strategy decisions are often reevaluated on-the-fly in view of the search results obtained from previous queries. Also, in order to optimize search efficiency and minimize error, it is a common practice to refer to and review previous search queries and/or data sets to verify the accuracy of the query or to perform additional search operations on a previously generated data set. Unfortunately, the current commercially-available user interfaces make it difficult for the operator to quickly and efficiently review the queries and data sets developed in selected levels of a hierarchical search strategy.

SUMMARY OF THE INVENTION

It is one objective of the present invention to provide a method for use in a data processing system for maintaining a record of set-creating activities and associated sets, which includes the steps of creating and displaying a plurality of visual representations, one for each of the set-creating activities, and arranging the visual representations to indicate a hierarchical relationship within the set-creating activities. The hierarchical arrangement of set-creating activities provides a record of set-creating data processing activities and associated data sets which provide the operator with a visual indication of the set-creating activity chronology.

It is another objective of the present invention to allow the visual representations of set-creating activities and associated data sets to serve as software buttons to allow for selected viewing and manipulation of at least one of (a) the set-creating data processing instructions, and (b) the associated data sets.

It is yet another objective of the present invention to provide a method for maintaining a record of set-creating data processing activities which allows the use of visual representations to select for viewing a particular one of a plurality of set-creating activities, and associated data sets, and displaying the particular one of the set-creating activities or data sets. It is another objective of the present invention to allow for the display of the set-creating activities or data sets in a presentation format corresponding to a selected operator input. Alternatively, it is an objective to allow for the displaying of the set-creating activities or associated data sets for a duration corresponding to an operator input.

It is yet another objective of the present invention to provide a data processing system for efficiently maintaining a record of set-creating data processing activities and associated data sets, which includes: a means for creating and displaying a plurality of visual representations, one for each of the set-creating data processing activities; a means for arranging said visual representations to indicate a hierarchical relationship within the set-creating data processing activities; and a means for allowing selective viewing of at least one of (a) said set-creating data processing activities, and (b) said associated data sets.

These and other objectives are achieved as is now described. Viewed broadly, the method of the present invention is directed to maintaining a record of set-creating activities and associated sets, and includes a number of method steps including: (a) creating and displaying a plurality of visual representations, one for each of the set-creating activities, and (b) arranging the visual representations to indicate a hierarchical relationship within said set-creating activities. In the preferred embodiment, the method further includes using a selected one of the visual representations to select for viewing a particular one of the set-creating activities, and displaying the particular one of the set-creating activities on the data processing system. Preferably, the method further includes the steps of using a selected one of the visual representations to select for viewing a particular one of the associated sets, and displaying the particular one of the associated sets on the data processing system. In the preferred embodiment, the method further includes displaying said particular one of the set-creating activities or the associated sets for a time interval corresponding to a duration of an operator input activity. Alternatively, the method consists of displaying said particular one of the set-creating activities or associated data sets for a time interval defined by an initiating operator input and a terminating operator input.

The present invention may also be viewed as a data processing system which efficiently maintains a record of set-creating data processing activities and associated data sets. The data processing system includes a number of conventional components, plus: (a) means for creating and displaying a plurality of visual representations, one for each of the set-creating data processing activities; (b) means for arranging said visual representations to indicate a hierarchical relationship within said set-creating data processing activities; and (c) means for allowing selected viewing of at least one of said set-creating data processing activities and/or said associated data sets.

The above as well as additional objectives, features, and advantages of the present invention will become apparent in the following detailed written description.

BRIEF DESCRIPTION OF THE DRAWINGS

The novel features believed characteristic of the invention are set forth in the appended claims. The invention itself however, as well as a preferred mode of use, further objectives and advantages thereof, will best be understood by reference to the following detailed description of an illustrative embodiment when read in conjunction with the accompanying drawings, wherein:

DETAILED DESCRIPTION OF PREFERRED EMBODIMENT

Figure 1:
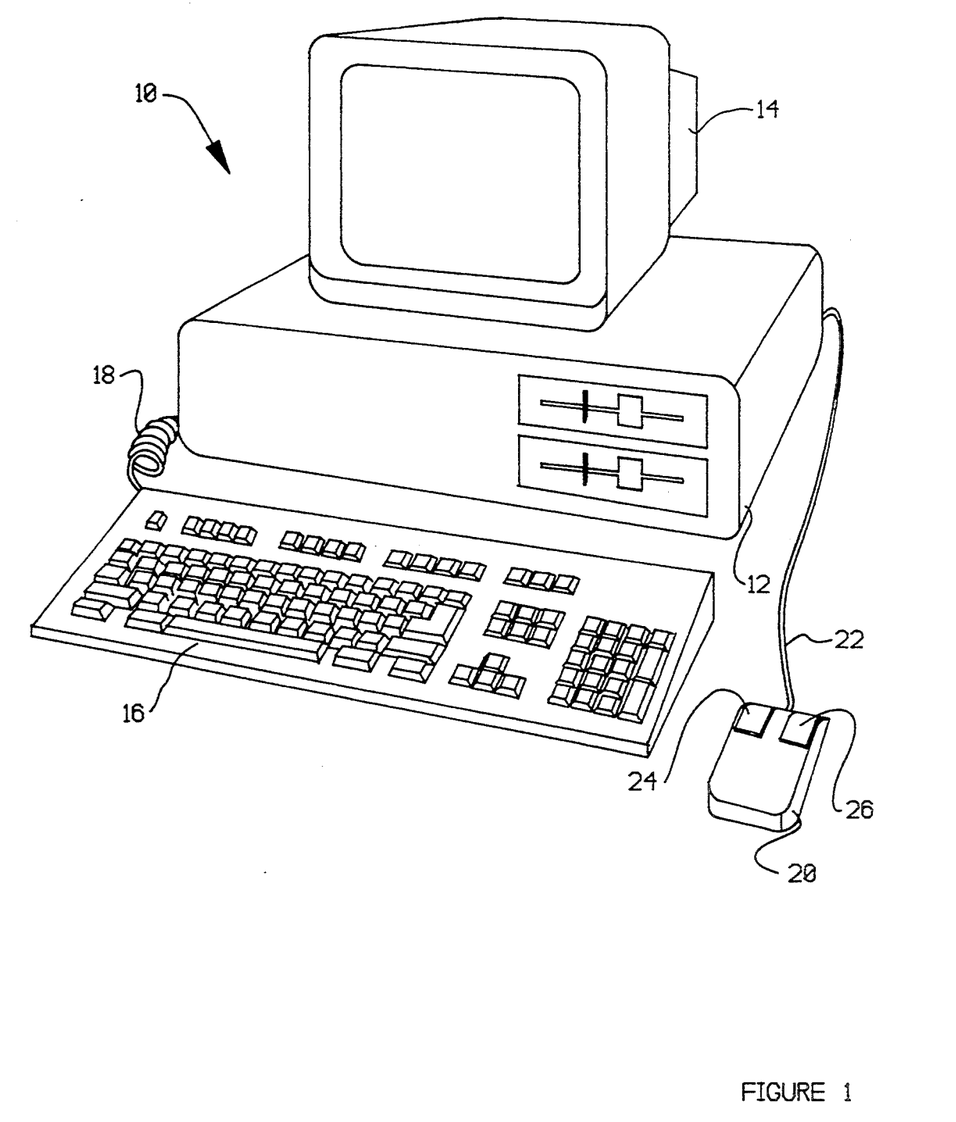
FIG. 1 is a pictorial representation of a data processing system in accordance with the present invention.

With reference now to the figures and in particular with reference to FIG. 1, there is depicted a pictorial representation of data processing system 10 which may be programmed in accordance with the present invention. As may be seen, data processing system 10 includes processor 12 which preferably includes a graphics processor, memory device and central processor (not shown). Coupled to processor 12 is video display 14 which may be implemented utilizing either a color or monochromatic monitor, in a manner well known in the art. Also coupled to processor 12 is keyboard 16. Keyboard 16 preferably comprises a standard computer keyboard which is coupled to the processor by means of cable 18.

Also coupled to processor 12 is a graphical pointing device, such as mouse 20. Mouse 20 is coupled to processor 12, in a manner well known in the art, via cable 22. As is shown, mouse 20 may include left button 24, and right button 26, each of which may be depressed, or "clicked", to provide command and control signals to data processing system 10. While the disclosed embodiment of the present invention utilizes a mouse, those skilled in the art will appreciate that any graphical pointing device such as a light pen or touch sensitive screen may be utilized to implement the method of the present invention. Upon reference to the foregoing, those skilled in the art will appreciate that data processing system 10 may be implemented utilizing a so-called personal computer, such as the Model 80 PS/2 computer manufactured by International Business Machines Corporation of Armonk, N.Y.

Figure 2A:
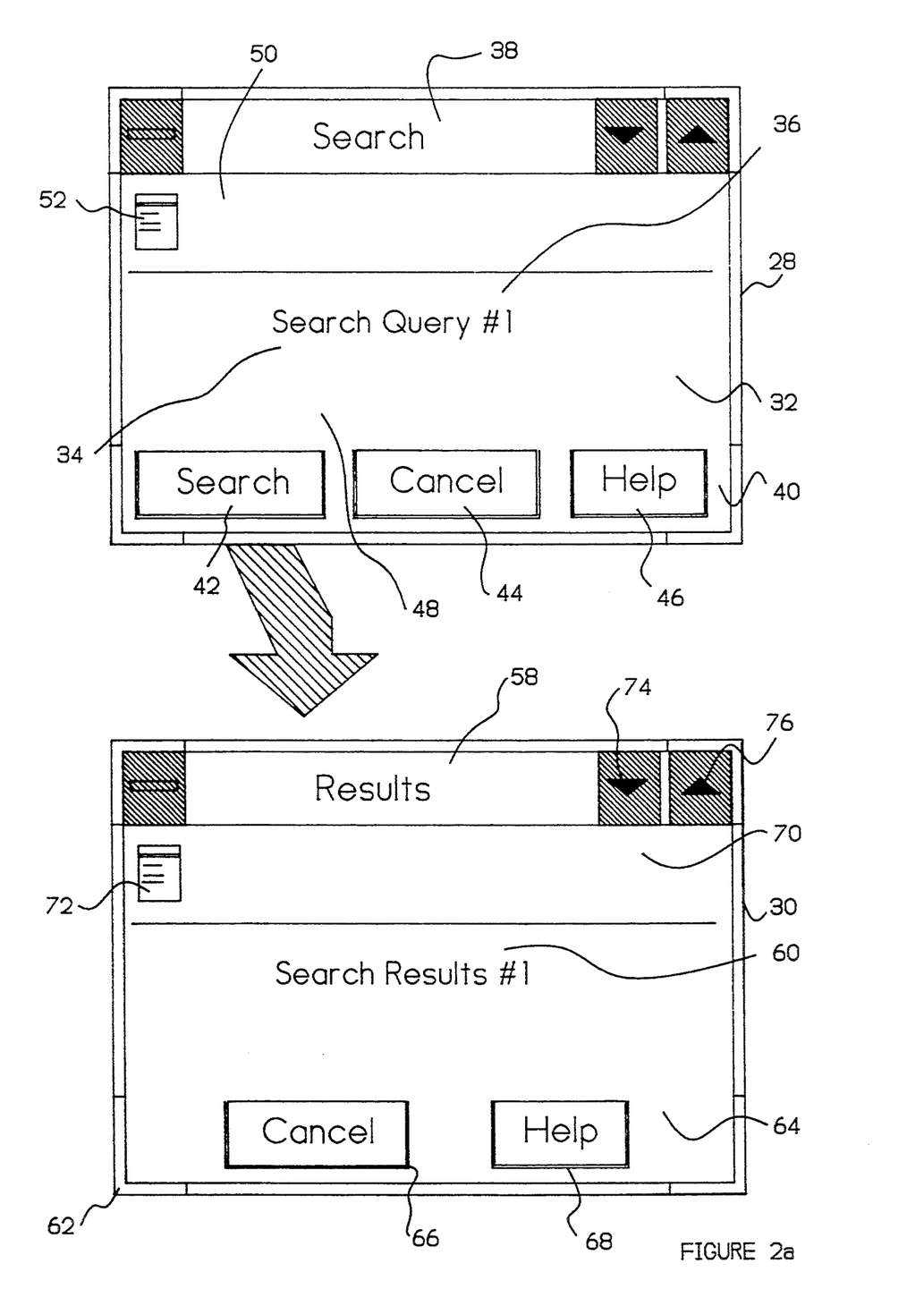
FIGS. 2a, 2b, and 2c depict a progression of operator interface windows which graphically depict the technique of the present invention for maintaining a record of set-creating, activities and associated sets.
Figure 2B:
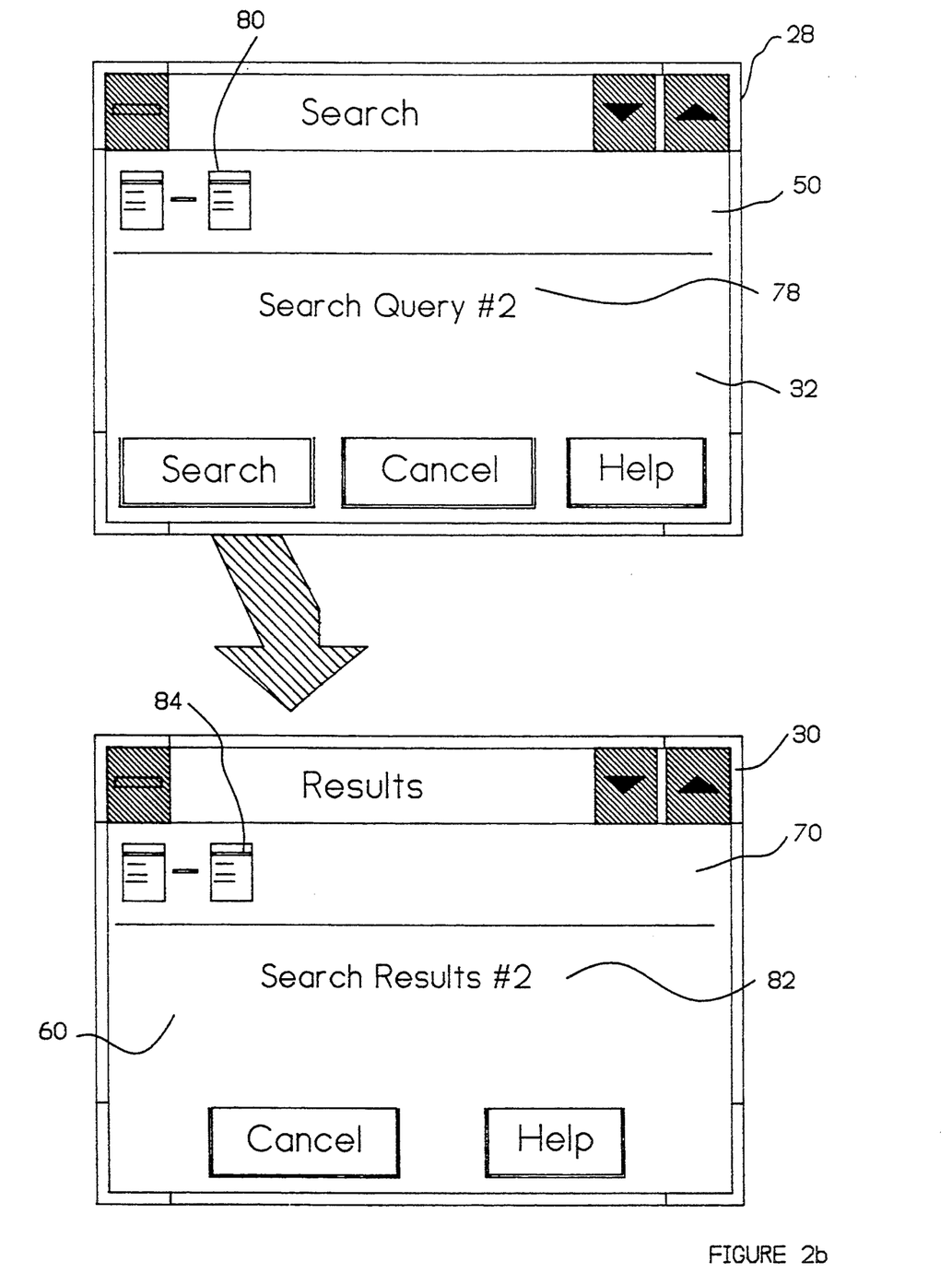
Figure 2C:
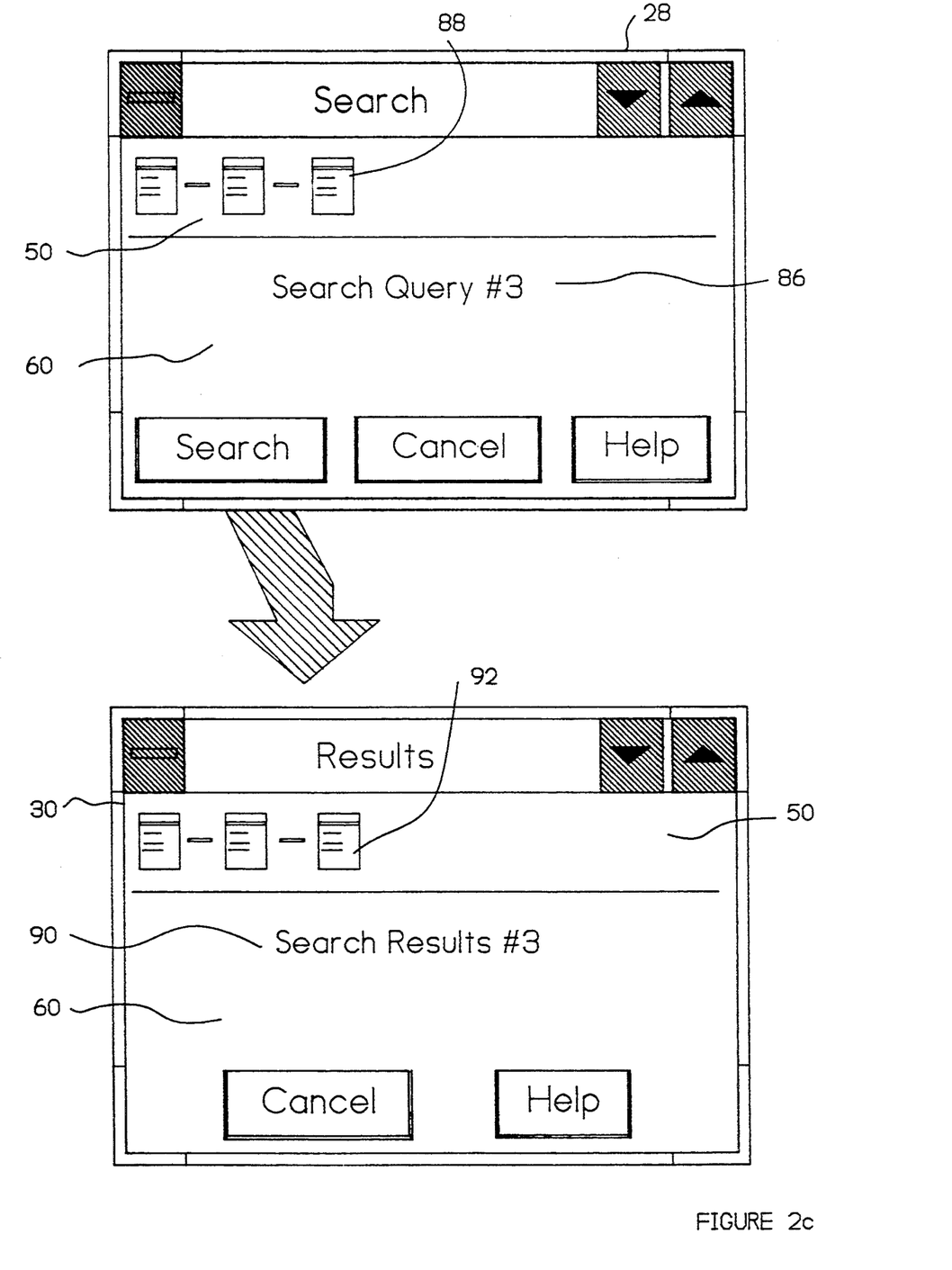

FIGS. 2a, 2b, and 2c provide a chronological progression of user interface windows which are provided to receive search queries from an operator, and display search results which are developed as a result of execution of the search queries. Particularly, windows 28, 30 may be displayed simultaneously, or consecutively, on video display 14 of data processing system 10. In the preferred embodiment of the present invention, windows 28, 30 are display simultaneously on video display 14, to facilitate efficient user interaction therewith. As is shown, window 28 defines an active workspace 32; when cursor 34 is located within workspace 32, search queries may be entered using keyboard 16. Search query 36, such as search query number one, may be typed into workspace 32 in a format which is consistent with the database that is being searched. There are a great number of commercially available databases which may be accessed by the public for fees. Each of these commercially available databases is responsive to certain types of search queries, provided they are presented in predetermined, and acceptable query formats. For example, the WESTLAW and LEXIS legal research databases allow for full-text keyword and descriptor field searching provided that the search queries are formulated in a predetermined and predefined acceptable query format. Likewise, those databases available through the DIALOG database service require that queries be formulated in predefined and acceptable query formats.

As is shown in FIG. 2a, window 28 is dedicated for receiving search queries, and thus includes title section 38 which indicates this dedicated function. Function buttons 40 are provided at the lowermost portion of window 28, and include search button 42, cancel button 44, and help button 46. A graphical pointing device, such as mouse 20, may be used to locate a pointer on any one of function buttons 40, to call that particular function. If mouse 20 is employed to move pointer 48 to search button 42, and is depressed, search query 36 which is set forth in workspace 32 of window 28 will be executed by data processing system 10. Alternatively, if mouse 20 is used to locate pointer 48 on cancel button 44, and mouse 20 is depressed, the on-going search operation is cancelled, and additional search operations may be conducted. This is particularly useful if the operator determines that an on-going search operation will not yield useful data, or contains a strategy or typing error. Alternatively, mouse 20 may be used to locate pointer 48 to help button 46. If mouse 20 is depressed, a user help screen is displayed which provides a menu of options for the user in determining the basic operation of the search program, the content of the database, or other similar information matters.

Also, as is shown in FIG. 2a, icon fill 50 is provided above workspace 32, and is dedicated for presenting to the operator a visual representation of the search or searches which have been performed since the search session began. In the preferred embodiment of the present invention, when search query 36 is typed into workspace 32, and the search button 42 is selected and depressed, icon 52 is automatically displayed in icon field 50 to provide a visual representation of search query 36. As will be discussed herebelow, additional icons may be provided in icon field 50, each of which corresponds to a different search query which has been performed on data contained in the selected database.

As was discussed above, search queries represent one type of set-generating activity which can be performed upon a selected database, or subset thereof, to create a set. Most commercially available search programs and commercially-available electronic databases allow for the rudimentary set operations to be performed. These operations include "and" operations "or" operations, "nand" operations, and "nor" operations. The data set which is generated as a result of execution of search query 36 is selectively displayed in window 30, which is dedicated for use in displaying all or portions of the search results which comprise the data set. Consequently, title section 58 indicates that this window 30 is dedicated for displaying search "results". Workspace 60 is provided within window 30 for the display of all or portions of the data set of search results 62.

Function buttons 64 are provided at the lowermost portion of window 30, and include cancel button 66 and help button 68. Cancel button 66 may be selected to discard search results. Help button 68 may be used to call up a help screen with a menu which provides a number of informational displays. As is shown, icon field 70 is provided at the uppermost portion of window 30. This field is dedicated for receiving icons which represent search results, such as search results 62. As is shown, icon 72 corresponds to search results 62 which were generated as a result of execution of search query 36. Frequently, search results 62 comprise lengthy listing of data elements which correspond to the requirements provided by search query 36. Accordingly, a scroll bar function may be provided to allow for scrolling operations to allow rapid review of large data sets.

As is shown in FIGS. 2b and 2c, the entry and execution of additional search queries results in the automatic generation and display of icons which represent both the query and the associated data set in the appropriate ones of windows 28, 30. As is shown in FIG. 2b, the operator may input search query 78 in workspace 32 of window 28, and have it executed by data processing system 10. In accordance with the present invention, icon 80 is automatically generated and displayed in icon field 50 of window 28 as a visual representation of search query 78 which has been executed by data processing system 10. The search results 82 which are generated by the execution of search query 78 are automatically displayed in workspace 60 of window 30, and a corresponding icon 84 which visually represents results 82 is automatically generated and displayed in icon field 70 of window 30.

The formation and execution of an additional search query is represented in FIG. 2c. As is shown therein, search query 86 may be entered by the operator in workspace 60 of window 28. Upon execution of search query 86, icon 88 is automatically generated and displayed in icon field 50 of window 28 to provide a visual representation of search query 86. After search query 86 is fully executed, search results 90 are displayed in workspace 60 of window 30, and icon 92 is automatically generated and displayed in icon field 50 of window 30 as a visual representation of search results 90.

In this manner, the chronological and logical progression of search strategies and associated data sets is visually represented in icon fields 50, 70 of windows 28, 30 to indicate the chronological and hierarchical relationship between search strategies and search results. This iconic representation of search strategies and search results provides a useful "mapping" system for the progression of a search strategy. Of course, many additional search queries may be formulated and executed by data processing system 10; the iconographic representation of search queries and search results becomes increasingly more beneficial to an operator when large sequences of logically related searches are performed utilizing data processing system 10.

Figure 3A:
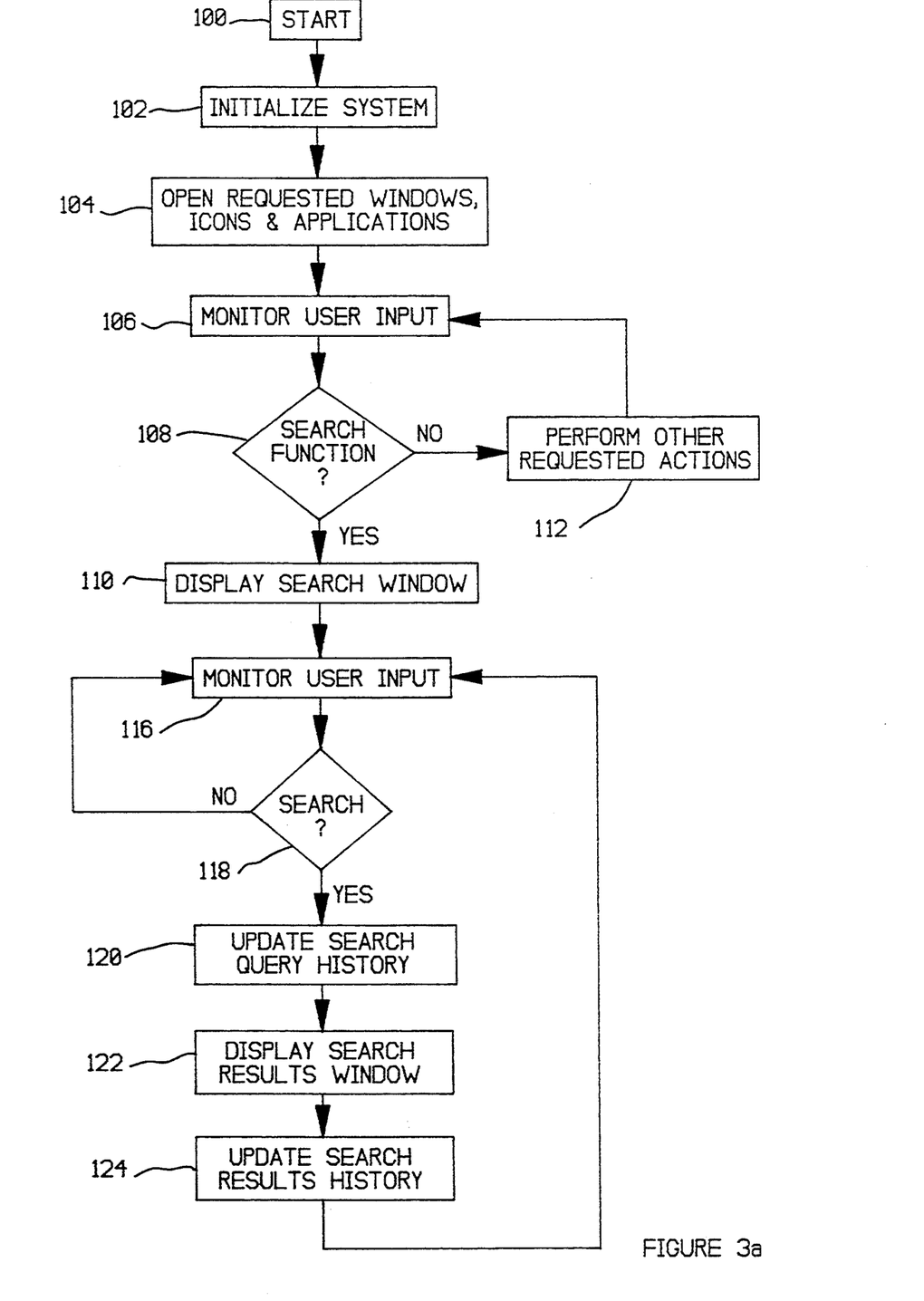
FIGS. 3a, 3b, 3c and 3d provide a flowchart representation of the software employed in providing and updating a record of set-creating data processing activities and associated data sets.
Figure 3B:
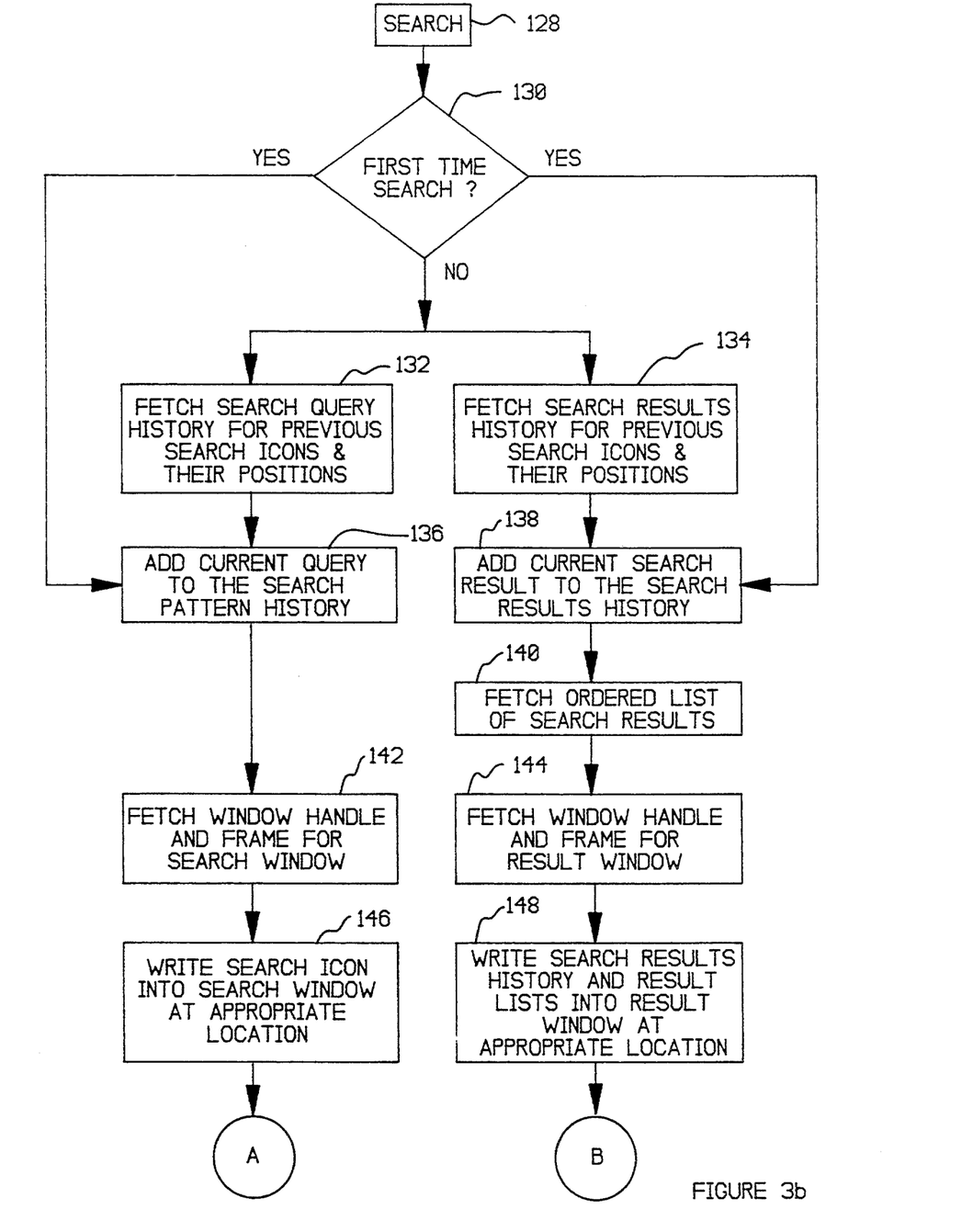
Figure 3C:
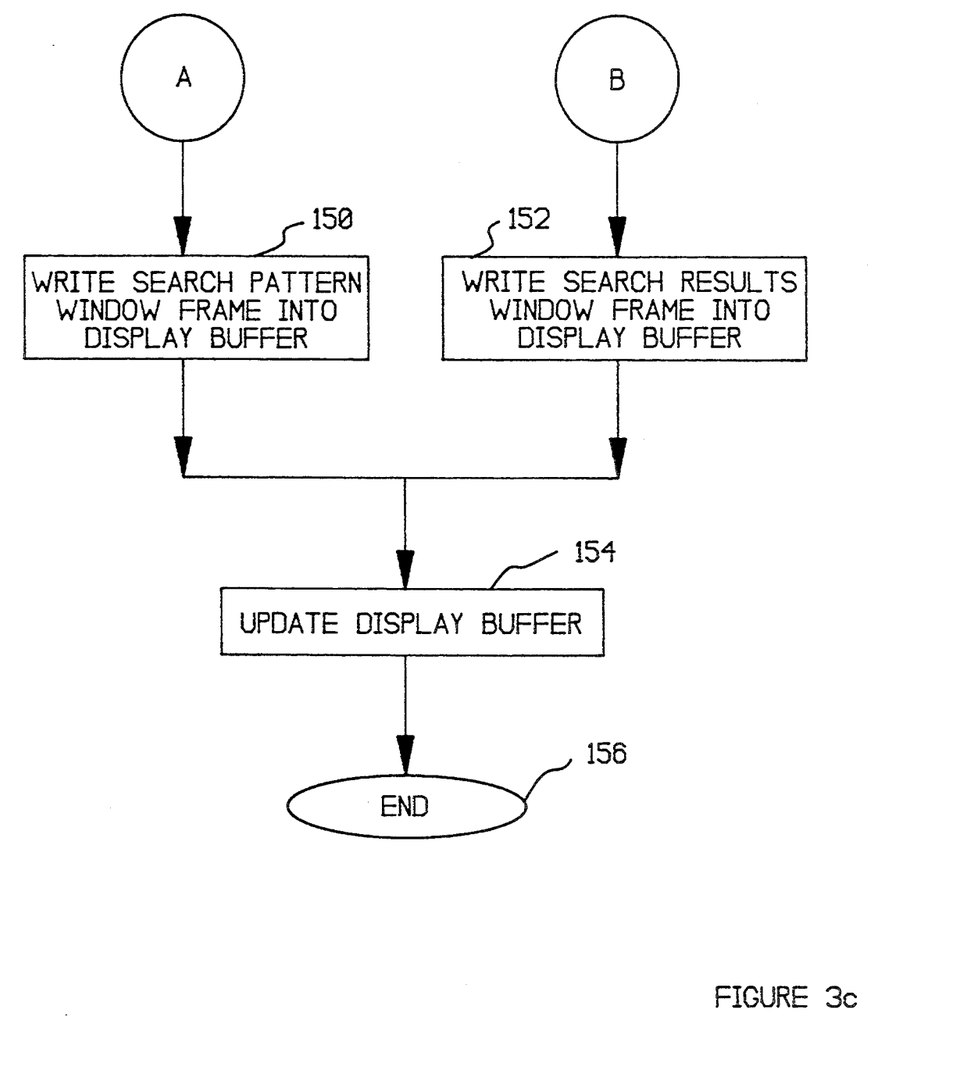
Figure 3D:
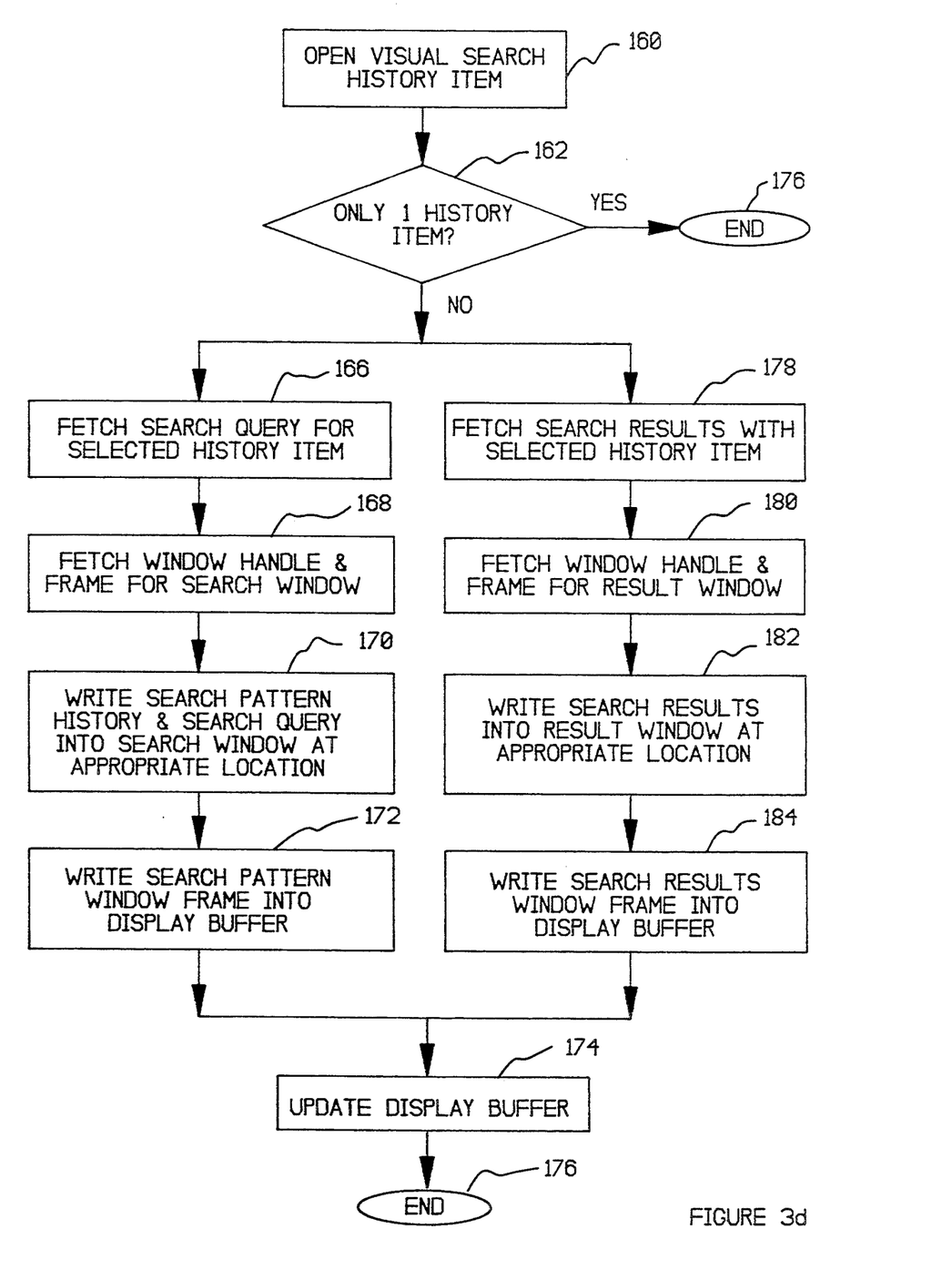

FIGS. 3a, 3b, and 3c depict in flowchart form the preferred computer program operations which are required to implement the present invention. With reference first to FIG. 3a, the process starts at software block 100, and continues at software block 102 in which the data processing system 10 is initialized, in accordance with conventional techniques. The process continues in software block 104, wherein routines for requested windows, and corresponding icons, as well as requested applications are opened by the data processing system 10. In block 106, user input is monitored to determine if a search function is requested. If the data processing system 10 determines that a search function is not requested, other requested actions are performed, as is set forth in software block 112.

If, however, a search function is requested in software block 108, the process continues in block 110, wherein search window 28 is displayed on video display 14 of data processing system 10. In accordance with software block 116, user input is monitored in workspace 32, which is an "active" space. As was discussed above, cursor 34 and keyboard 16 are utilized to input alphanumeric search queries in accordance with preestablished and conventional search query syntax and formats. Once a search query is typed into workspace 42 of window 28, mouse 20 may be utilized to move pointer 48 onto search button 42. Either left button 24 or right button 26 may be used to "click" mouse 20, thus initiating the execution of search query 36. Software block 118 represents the monitoring and detection of the initiation of a search activity by actuation of search button 42.

As is depicted in software block 120, the query history provided in icon field 50 of window 28 is updated by the automatic generation and display of iconographic representation of the search query. In block 122, the search results are displayed in window 30 and, in accordance with block 124, the search results history is updated by the automatic generation and display of an iconographic representation of the search results in icon field 70 of window 30. As is shown in FIG. 3a, the system returns to software block 116, wherein user input is monitored. The user may perform a series of search operations; for each search operation, an iconographic representation of both the search query and the search results will be provided in icon fields 50, 70 of windows 28, 30 to provide a visual representation of both the data processing set-generating instructions which comprise the search query, as well as the data set which comprises the search results for each query.

FIG. 3b provides a flowchart representation of the software routines which are employed to update the search query history and search result history. The process begins at software block 128, wherein data processing system 10 determines that a search is being executed. In software decision block 130, data processing system 10 determines whether the search is a first time search query in a strategy. If data processing system 10 determines that the search being executed is an initial search activity, the process continues by simultaneous execution of the functions of software blocks 136, 138; however, if it is determined in software block 130 that prior search activities exist for this search session, the process continues simultaneously in software blocks 132, 134. If previous search queries exist, in accordance with software block 132, data processing system 10 fetches the query history for previous search icons and their relative positions; in addition, data processing system 10 fetches the search results history for previous search icons and their relative positions, in accordance with software block 134. Next, data processing system 10 adds the current query to the search pattern history, in accordance with software block 136; additionally, data processing system 10 adds the current search result history to the search result history. In software block 140, data processing system 10 fetches the ordered list of search results for displaying in workspace 60 of window 30.

In accordance with software blocks 142, 144, data processing system 10 fetches the window handle and frame for search window 28, as well as the window handle and frame for result window 30. Then, in accordance with software blocks 146, 148, data processing system 10 writes the search icon into icon field 50 of search window 28 at the appropriate location; simultaneously, data processing system 10 writes the search results history and resultant history of search items into the result window 30 at appropriate locations. Any one of a number of conventions can be established for indicating the relative hierarchical (and chronological) position of each search query and associated results relative to previous and subsequent search queries and search results. As is shown in FIGS. 2a, 2b, and 2c, in the preferred embodiment, the left-most icons represent the earliest searches in a hierarchical arrangement, while the right-most icons represent those later in time. In accordance with software blocks 150, 152, data processing system writes the search pattern window frame into a display buffer, and simultaneously writes the results window frame into a display buffer. In accordance with software block 154, data processing system 10 updates the display buffer. In step 156, the process ends.

Another important component of the present invention is that the iconographic representation of search queries and search results may be used to access previously performed search queries and associated data sets. It is fundamental to this operation that the data processing instructions which comprise a query be automatically saved at the conclusion of execution of the search query. Also, it is important that the search results likewise be automatically saved. The iconic representation of either a search query or a data set which are disposed in icon fields 50, 70 may be selected by operator actuation of mouse 20. More specifically, mouse 20 may be employed to locate pointer 48 on a selected iconographic representation of either a search query icon or a search result icon. One of left button 24 or right button 26 may be depressed by the operator to select that particular search query or search result for viewing. This step of selecting the particular iconographic representation of the search query or search result is graphically depicted in FIG. 3c as software block 160.

In software block 162, data processing system 10 determines whether there are multiple levels in the search. If only one level of searching exists, the data processing instructions for the search query and the associated search results are already displayed in windows 28, 30, so the process ends at software block 176. If multiple search levels exist, then the process continues simultaneously in software blocks 166, 178. In accordance with software block 166, data processing system 10 fetches from computer memory the data processing instructions which correspond to the search query item which has been selected from the hierarchical arrangement of icons in icon field 50 of window 28. Simultaneously, data processing system 10 fetches from computer memory the search results which correspond to that particular query.

The process continues in software blocks 168, 180, wherein data processing system 10 fetches the window handle and frame for the search window 28, as well as the window handle and frame for the result window 30. In accordance with software blocks 170, 182, data processing system 10 writes the selected search query into search window 28 at the appropriate location. Simultaneously, data processing system 10 writes the associated search results into result window 30 at the appropriate location. Then, in accordance with software blocks 172, 184, data processing system 10 writes the search pattern window frame into a display buffer, and simultaneously writes the search results window frame into a display buffer. In accordance with software block 174, data processing system 10 updates the display buffer, and the process ends at step 176.

FIG. 3c depicts only the preferred embodiment of the present invention which requires that the selection of an iconic representation of a search query results in the simultaneous display of the data processing instructions which correspond with that query as well as the search results which were generated as a result of execution of that query. In alternative embodiments, selection of a particular iconic representation of either a search query or search results will result in display of only that particular search query or search results without displaying any corresponding query of search results. In fact, these functions can be provided as alternative functions by dedicating left button 24 of mouse 20 for retrieval and display of both a query and an associated data set, while dedicating right button 26 for retrieval and display of only the query or data set associated with the particular icon which is selected by pointer 48.

Figure 4:
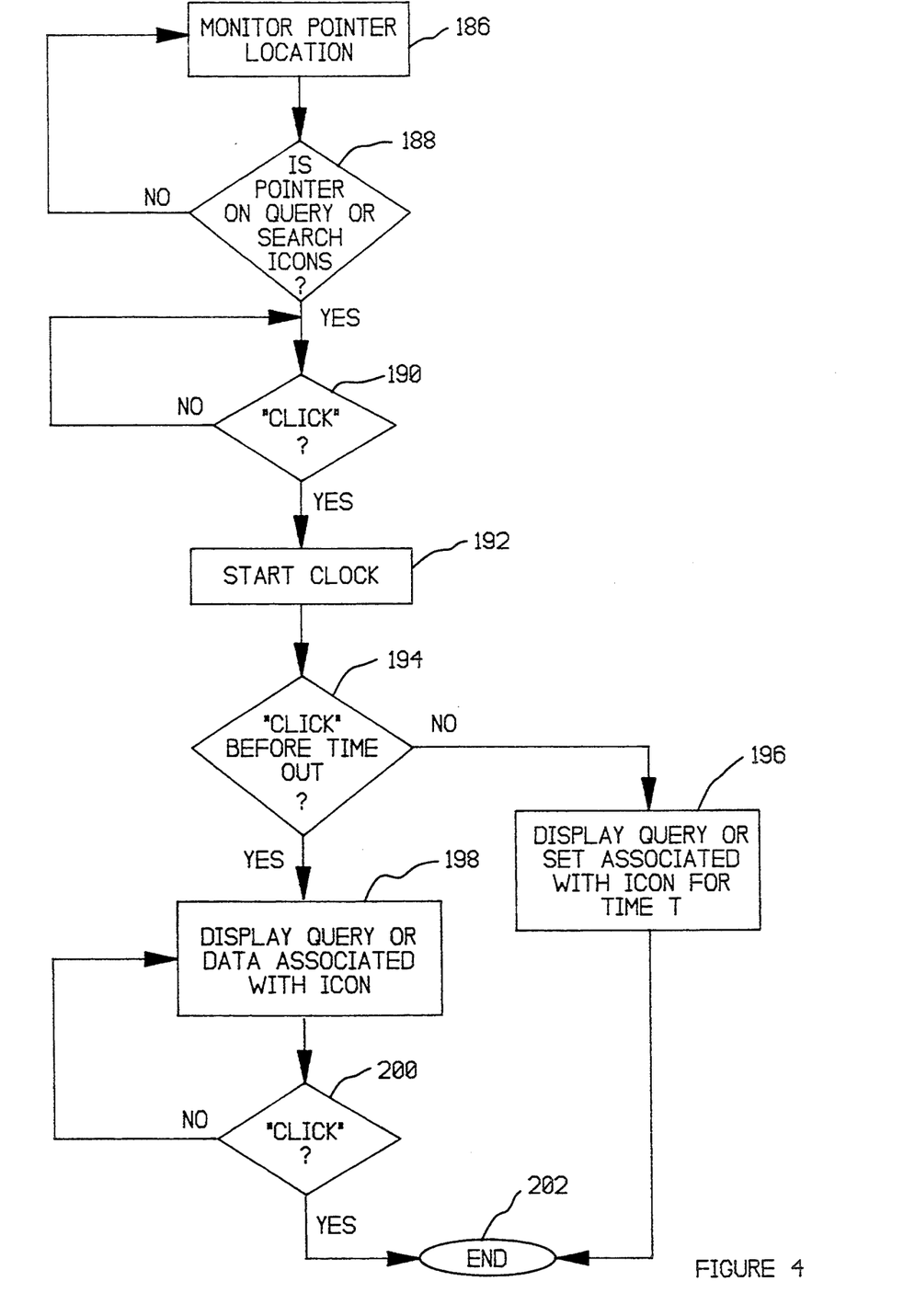
FIG. 4 is a flowchart representation of the software required to allow for operator selected viewing of the set-creating data processing activities and associated data sets.

FIG. 4 is a flowchart representation of an optional software routine which allows for control of the duration of display of retrieved search queries and/or associated data sets. The process begins at software block 186, wherein pointer 48 is located through manipulation of mouse 20 to a selected icon which is representative of either a query or a data set. In software block 188, the data processing system 10 determines whether pointer 48 is located on any of the query or search icons. In accordance with software block 188, if pointer 48 is not located on any particular query or search icon, the process returns to software block 186, wherein data processing system 10 continues monitoring pointer 48 location; however, if pointer 48 is located on a particular icon, data processing system 10 monitors to determine if left button 24 or right button 26 of mouse 20 have been depressed. This keying of left button 24 or right button 26 is generally known in the computer jargon as "clicking" of mouse 20. When a click occurs, data processing system 20 starts a clock, in accordance with software block 192. Data processing system 10 determines, in accordance with software block 194, whether an additional click occurs before time out of the software timer; if not, in accordance with software block 196, data processing system 10 displays the selected query or data set for a time period T; if a click does occur before the time out of the software timer, in accordance with software block 198, data processing system 10 displays the query or data associated with the icon for an indefinite period of time. Display of the query or set for time period T corresponds to a "peek" function, during which the query or data set is displayed on video display 14 for a predetermined time interval which is sufficiently long for a quick review, which is particularly useful in spot-checking search queries for errors and inaccuracies, as well as orienting oneself in the search hierarchy to make on-the-fly determinations of whether to reconfigure a search strategy. The longer display of the query or data set associated with the selected icon corresponds to a "view" function, which is particularly useful for more detailed study and review of previous search queries and data sets. The view function is initiated by the click detected in software block 194, but is terminated by the click associated with software block 200. Therefore, an initiating operator input begins the view period and a terminating operator input terminates the view period, so the operator has complete control over the duration of the display of the selected query or data set. Whether a peek or view function is selected, the process ends at software block 202.

While the invention has been particularly shown and described with reference to a preferred embodiment, it will be understood by those skilled in the art that various changes in form and detail may be made therein without departing from the spirit and scope of the invention.

We claim:

1. A method in a data processing system for maintaining a record of set-creating activities and associated sets, comprising the method sets of:
   creating a textual record of set-creating search queries and associated search result sets;
   creating and displaying a plurality of visual representations, separate from said textual record of set-creating search queries and associated search result sets, which comprise a plurality of icons, one for each of said set-creating search queries, each consisting of at least an image; and
   arranging said visual representations to indicate a hierarchical relationship within said set-creating search queries.

2. A method according to claim 1, further comprising:
   using a selected one of said visual representations to select for viewing a particular one of said set-creating search queries; and
   displaying said particular one of said set-creating search queries.

3. A method according to claim 2, wherein said step of displaying comprises:
   displaying said particular one of said set-creating search queries for a time interval corresponding to an operator input.

4. A method according to claim 2, wherein said step of displaying comprises:
   displaying said particular one of said set-creating search queries for a time interval corresponding to a duration of an operator input activity.

5. A method according to claim 2, wherein said step of displaying comprises:
   displaying said particular one of said set-creating search queries in a selected one of a plurality of presentation formats in response to an operator input.

6. A method according to claim 2, further comprising:
   simultaneously maintaining an active workspace for receiving operator input for generation of additional set-creating search queries.

7. A method according to claim 2, whenever said step of displaying comprises:
   displaying said particular one of said set-creating search queries for a time interval defined by an initiating operator input and a terminating operator input.

8. A method according to claim 1, further comprising:
   using a selected one of said visual representations to select for viewing a particular one of said associated search result sets; and
   displaying said particular one of said associated sets.

9. A method according to claim 8, wherein said step of displaying comprises:
   displaying said particular one of said associated search result sets for a time interval corresponding to an operator input.

10. A method according to claim 8, wherein said step of displaying comprises:
    displaying said particular one of said associated search result sets for a time interval corresponding to a duration of an operator input activity.

11. A method according to claim 8, wherein said step of displaying comprises:
    displaying said particular one of said associated search result sets in a selected one of a plurality of presentation formats, in response to an operator input.

12. A method according to claim 8, further comprising:
    simultaneously maintaining an active work space for receiving operator input for generation of additional set-creating search queries.

13. A method according to claim 8, whenever said step of displaying comprises:
    displaying said particular one of said associated search result sets for a time interval defined by an initiating operator input and a terminating operator input.

14. A method according to claim 1, wherein said hierarchical relationship provides a visual indication of set creation chronology.

15. A method according to claim 1, wherein:
    after execution, said set-creating search queries are automatically stored in said data processing system and associated with particular ones of said plurality of visual representations in accordance with said hierarchical relationship.

16. A method according to claim 1, further comprising:

simultaneously maintaining an active workspace for receiving operator input for generation of additional set-creating search queries.

17. A method in a data processing system for maintaining a record of set-creating data processing activities and associated data sets comprising the method steps of:

receiving and processing set-creating data processing instructions and thereby producing an associated data set;

automatically storing a textual record of said set-creating data processing instructions and associated data set in said data processing system;

creating and displaying a visual representation separate from said set-creating data processing instructions and data set of said set-creating data processing instructions and associated data set in a workspace, said visual representation comprising an icon which includes at least an image;

maintaining an active workspace in said data processing system for receipt of additional set-creating data processing instructions;

receiving and processing additional set-creating data processing instructions and thereby producing additional associated data sets;

automatically storing said additional textual records of set-creating data processing instructions and associated data sets in said data processing system;

creating and displaying additional visual representations, separate from said set-creating data processing instructions and associated data sets, of said set-creating data processing instructions and associated data sets in said workspace, said visual representations comprising icons which each include an image;

arranging said visual representations hierarchically to indicate a progression of set-creating data processing activities; and using said visual representations as software buttons for selective viewing of at least one of (a) said set-creating data processing instructions and (b) said associated data sets.

18. A method according to claim 17, wherein said visual representations are arranged in a chronological hierarchy.

19. A method according to claim 17, further comprising:

displaying at least one of (a) said set-creating data processing instructions and (b) said associated data sets in one of a plurality of viewing formats in response to an operator output.

20. A method according to claim 17, further comprising:

displaying at least one of (a) said set-creating data processing instructions and (b) said associated data sets for selected duration in response to an operator input.

21. A data processing system for efficiently maintaining a record of set-creating data processing activities and associated data sets, comprising:

means for creating and displaying a textual record of set-creating data processing search queries and associated search result sets;

means for creating and displaying a plurality of visual representations, one for each of said set-creating data processing search queries;

each of said plurality of visual representations consisting of an icon which includes at least an image portion;

means for arranging said visual representations to indicate a hierarchical relationship within said set-creating data processing search queries; and means for allowing selective viewing of at least one of (a) said set-creating data processing search queries, and (b) said associated search result sets.

22. A data processing system according to claim 21, further comprising:

means for maintaining at least one active workspace in said data processing system for receipt of instructions defining set-creating data processing search queries.

23. A data processing system according to claim 21, wherein said means for arranging comprises:

means for arranging said visual representations in a chronological hierarchy.

24. A data processing system according to claim 21, wherein said means for allowing selective viewing comprises:

means for allowing selective viewing of at least one of (a) said set-creating data processing search queries, and (b) said associated search result sets for a selected duration.

25. A data processing system according to claim 21, wherein said means for allowing selective viewing comprises:

means for allowing selective viewing of at least one of (a) said set-creating data processing search queries and (b) said associated search result sets in one of a plurality of viewing formats.

26. A data processing system according to claim 21, further comprising:

means for allowing application of set-creating data processing search queries to selected preexisting search result sets.

* * * * *